United States Patent
Nestorovic et al.

(10) Patent No.: US 12,416,802 B2
(45) Date of Patent: Sep. 16, 2025

(54) SCANNER LASER OPTICS FOR LIDAR

(71) Applicant: STMicroelectronics International N.V., Geneva (CH)

(72) Inventors: Nenad Nestorovic, Seattle, WA (US); Jack Schmidt, San Marcos, CA (US)

(73) Assignee: STMicroelectronics International N.V., Geneva (CH)

( * ) Notice: Subject to any disclaimer, the term of this patent is extended or adjusted under 35 U.S.C. 154(b) by 761 days.

(21) Appl. No.: 17/711,780

(22) Filed: Apr. 1, 2022

(65) Prior Publication Data
US 2023/0314791 A1 Oct. 5, 2023

(51) Int. Cl.
*G02B 26/08* (2006.01)
*G01S 7/481* (2006.01)
*G02B 26/10* (2006.01)
*G02B 27/09* (2006.01)

(52) U.S. Cl.
CPC ........ *G02B 26/0841* (2013.01); *G01S 7/4815* (2013.01); *G01S 7/4817* (2013.01); *G02B 26/10* (2013.01); *G02B 27/0955* (2013.01)

(58) Field of Classification Search
CPC G02B 26/0841; G02B 26/10; G02B 27/0955; G02B 26/105; G02B 27/0927; G02B 27/123; G01S 7/4815; G01S 7/4817
USPC ....................................... 356/5.01
See application file for complete search history.

(56) References Cited

U.S. PATENT DOCUMENTS

| | | |
|---|---|---|
| 2005/0063428 A1 | 3/2005 | Anikitchev et al. |
| 2012/0057345 A1 | 3/2012 | Kuchibhotla |
| 2018/0167602 A1 | 6/2018 | Pacala et al. |
| 2019/0162858 A1 | 5/2019 | McCord et al. |
| 2019/0293800 A1 | 9/2019 | Ramthun et al. |
| 2020/0090569 A1 | 3/2020 | Hajati et al. |
| 2023/0045982 A1* | 2/2023 | Lapstun ............. G02B 27/0093 |
| 2023/0296868 A1* | 9/2023 | Nestorovic ........ G02B 17/0657 356/4.01 |

FOREIGN PATENT DOCUMENTS

| | | |
|---|---|---|
| CN | 1991569 A | 7/2007 |
| CN | 110908105 A | 3/2020 |
| CN | 220105417 U | 11/2023 |
| EP | 0396128 A2 | 11/1990 |
| WO | 2019181300 A1 | 9/2019 |
| WO | 2021240978 A1 | 12/2021 |

OTHER PUBLICATIONS

EPO Search Report for counterpart EP Appl. No. 23162790.2, report dated Sep. 4, 2023, 6 pgs.
CN First Office Action and Search Report for counterpart CN. Appl. No. 202310338309.0, report dated Aug. 5, 2025, 12 pgs.

* cited by examiner

*Primary Examiner* — Md M Rahman
(74) *Attorney, Agent, or Firm* — Crowe & Dunlevy LLC

(57) ABSTRACT

Disclosed herein is an efficient optical scanning system takes the output of a multi-laser bar emitter with high divergence and delivers a combined beam of long vertical stripes of optical power that have a nearly top hat distribution along a vertical scanning axis and a narrow width along a horizontal scanning axis. This line footprint of the combined beam is scanned by a mirror onto a scene for use as ranging light in a distance measurement system.

17 Claims, 7 Drawing Sheets

SCANNER LASER OPTICS FOR LIDAR

TECHNICAL FIELD

This disclosure is related to the field of optics for use in a laser scanning application such as a Light Detection and Ranging (LIDAR) system.

BACKGROUND

A laser scanning projector is a small, portable electronic device. Laser scanning projectors may be paired to, or incorporated within, user devices such as smart glasses, head mounted displays, smartphones, tablets, or laptops, and used to project virtual and augmented reality, documents, images, or video stored on those user devices onto a projection surface, such as a wall, holographic surface, or inner display surface of virtual or augmented reality glasses (for example a wave guide in a coupling window).

Laser scanning projectors are also incorporated within distance determination systems, such as LIDAR systems, within vehicles to determine information about the vehicles relative to their surroundings, permitting the creation of advanced driver assistance systems.

In the case of a distance determination system, such laser scanning projectors typically include a projection system and an optical module. The optical module includes one or more laser sources and one or more microelectromechanical system (MEMS) mirrors that scan the laser beam produced by the one or more laser sources across the projection surface in a desired projection pattern. The projection system suitably drives the one or more laser sources such that distance determination can be performed by measuring the time between emission of a laser pulse emitted by the one or more laser sources and detection of photons of that laser pulse that have reflected off an object and been detected by a detector within the distance determination system. Given this time of flight and with the understanding of where the laser beam was scanned at any instant in time, a three-dimensional map of objects in the field of view of the distance determination system can be formed and utilized.

Optical elements may be employed along the path of the laser beam between the one or more laser sources and the one or more MEMS mirrors so as to focus or collimate the laser beam in desired ways, and likewise may be employed between the one or more MEMS mirrors and an exit window so as to focus or further collimate the laser beam in desired ways.

The projection pattern typically utilized in distance determination systems is a two-dimensional raster scan. This comes with certain challenges. For example, it may be difficult to keep the laser beam within an exit aperture as the laser beam is scanned in the projection pattern. Still further, it may be difficult to perform the two-dimensional raster scanning at a suitably fast enough rate for certain distance determination application. It is therefore desired for new optical modules to be developed that can achieve desired performance and efficiency while scanning the laser in a simplified projection pattern to thereby overcome the drawbacks of existing distance determination systems.

SUMMARY

Disclosed herein is an optical module for use in a laser scanning projector, such as a LIDAR system. The optical module serves to combine and focus multiple laser sources in a way so as to generate a combined laser beam that exhibits a low degree of divergence along an axis of movement of a uniaxial microelectromechanical system (MEMS) mirror located in the optical module but exhibits a high degree of divergence along an axis perpendicular to the axis of movement. The resulting combined laser beam is relatively uniform homogenous and uniform, and remains so as it is scanned along the axis of movement. The high divergence along the axis perpendicular to the axis of movement of the MEMS mirror permits the creation of a LIDAR system that utilizes one-dimensional scanning to form a three-dimensional map of a scene.

DETAILED DESCRIPTION

Figure 1:
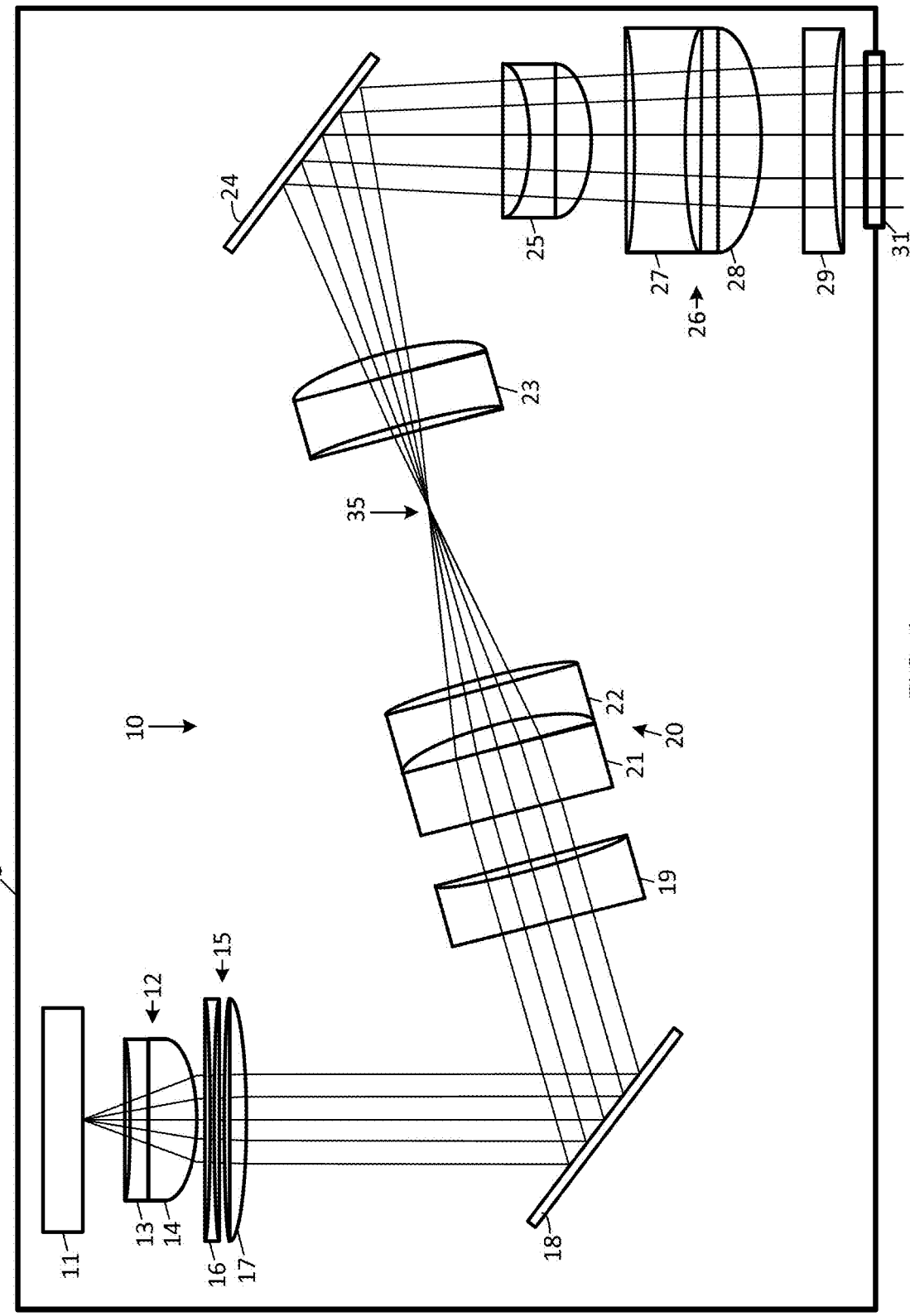
FIG. 1 is a diagrammatical representation of a first embodiment of an optical module disclosed herein such as may be used in a distance determination system.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Disclosed herein is an optical module 10 for use in a laser scanning projector such as a LIDAR system. In general, the goal for the optical module 10 is to generate a laser beam that exhibits a low degree of divergence along an axis of movement (e.g., horizontal axis, see FIG. 2) of a uniaxial microelectromechanical system (MEMS) mirror 24 located in the optical module 10 but exhibits a high degree of divergence along an axis (e.g., vertical axis, see FIG. 2) perpendicular to the axis of movement in an efficient manner that permits the creation of a LIDAR system that utilizes laser scanning along the horizontal axis to form a three-dimensional map of a scene, thereby overcoming drawbacks of existing systems that are based upon two-dimensional raster scans.

The optical module 10 includes a laser array 11 that is formed by multiple (e.g., eight) laser emitters within a single package, the eight laser emitters being arranged into an array such as a one-dimensional array, each laser emitter being formed of multiple (e.g., three) laser cavities positioned close to one another. These laser emitters are each spaced such that the individual infrared laser beams generated by adjacent laser emitters overlap in part (e.g., the footprint of the individual laser beams is greater than the path divergence of those individual laser beams) to form a combined laser beam that has a generally pill-shaped cross section. The combined laser beam has a fast axis and a slow axis as understood by those of ordinary skill in the art. The fast axis is called the fast axis because the beam divergence is larger along the fast axis than the slow axis. Thus, as one moves away from the laser array 10, the fast axis diameter grows at a faster rate than the diameter along the slow axis, and so it can be said that the laser beam diverges faster along its fast axis. The slow axis still diverges, however, the angle of divergence is smaller.

A lens doublet 12 is located immediately downstream of the laser 11 and serves to focus the fast axis of the combined laser beam such that the divergence of the fast axis generally matches the divergence of the slow axis. As understood by those of skill in the art, a lens doublet is formed by two individual lensed bonded together at an interface. The lens doublet 12, in particular, is formed by a plano-concave lens 13 which has an upstream surface with a concave shaped cross section and a downstream surface with a planar cross section and a plano-convex lens 14 which has an upstream surface with a planar cross section and a downstream surface with a convex cross section. The plano-concave lens 13 and plano-convex lens 14 are bonded at the interface between the downstream planar surface of the plano-concave lens 13 and the upstream planar surface of the plano-convex lens 14. The downstream surface of the plano-concave lens 13 and the upstream surface of the plano-convex lens 14 may be matched.

A lens doublet 15 is located immediately downstream of the first lens doublet 12 and serves to focus both the fast axis and the slow axis of the combined laser beam, although with this lens doublet 15 the focusing is slightly more focused along the slow axis. The lens doublet is formed by a concave lens 16 having upstream and downstream surfaces that both have concave cross sections and a convex lens 17 having upstream and downstream surfaces that both have convex cross sections. The downstream surface of the convex lens 17 is generally paraboloid in shape to help correct for pupil aberrations. The concave lens 16 and convex lens 17 are bonded at the interface between the downstream surface of the concave lens 16 and the upstream surface of the convex lens 17.

A folding mirror 18 is located immediately downstream of the second lens doublet 15 and serves to change the direction of travel of the combined laser beam. This function of the folding mirror 18 is used to keep the physical space occupied by the optical module 10 compact and fitting within a housing 5. Thus, it will be appreciated by those of ordinary skill in the art that the use of the folding mirror 18 is a matter of design choice and is optional.

A plano-concave lens 19 is located immediately downstream of the folding mirror 18 and has an upstream surface with a planar cross section and a downstream surface with a concave cross section.

A lens doublet 20 is located immediately downstream of the plano-concave lens 19. The lens doublet 20 is formed by a plano-convex lens 21 having an upstream surface with a planar cross section and a downstream surface with a convex cross section and a concave-convex lens 22 having an upstream surface with a concave cross section and a downstream surface with a convex cross section. The plano-convex lens 21 and concave-convex lens 22 are bonded at the interface between the downstream surface of the plano-convex lens 21 and the upstream surface of the concave-convex lens 22. The downstream surface of the plano-convex lens 21 and the upstream surface of the concave-convex lens 22 may be matched.

Collectively, the plano-concave lens 19 and lens doublet 20 serve to help limit the divergence of the combined laser beam along the axis of movement while serving to help cause a high degree of divergence of the combined laser beam along the axis perpendicular to the axis of movement.

It will be noticed that due to the length of the optical path, a focal point 35 occurs along the optical path between the lens doublet 20 and the concave-convex lens 23. The occurrence of this focal point could be eliminated by reducing the length of the optical path, although this focal point does not negatively impact operation because the optical module 10 as shown in FIG. 1 is expressly designed to not have components placed at this focal point. In fact, this focal point helps provide the optical module 10 with enhanced thermal stability in that the far field irradiation pattern formed by the combined laser beam remains generally constant over temperature and wavelength drifting.

A concave-convex lens 23 is downstream of the lens doublet 20, is immediately downstream of the focal point 35, and has an upstream surface with a concave cross section and a downstream surface with a convex cross section.

The MEMS mirror 24, which may be operated at resonance, is located immediately downstream of the concave-convex lens 23 and serves to scan the combined laser beam in a unidirectional scan pattern—for example, this scan pattern may be along the horizontal axis.

A convex-concave lens 25 is located immediately downstream of the MEMS mirror 24 and has an upstream surface with a concave cross section and a downstream surface with a convex cross section.

A lens doublet 26 is located immediately downstream of the convex-concave lens 25. The doublet 26 is formed by concave lens 27 which has upstream and downstream surfaces that both have concave cross sections and a convex lens 28 that has upstream and downstream surfaces that both have convex cross sections. The concave lens 27 and convex lens 28 are bonded at the interface between the downstream surface of the concave lens 27 and the upstream surface of the convex lens 28.

A plano-concave lens 29 is located immediately downstream of the lens doublet 26 and has an upstream surface with a planar cross section and a downstream surface with a concave cross section.

Figure 2:
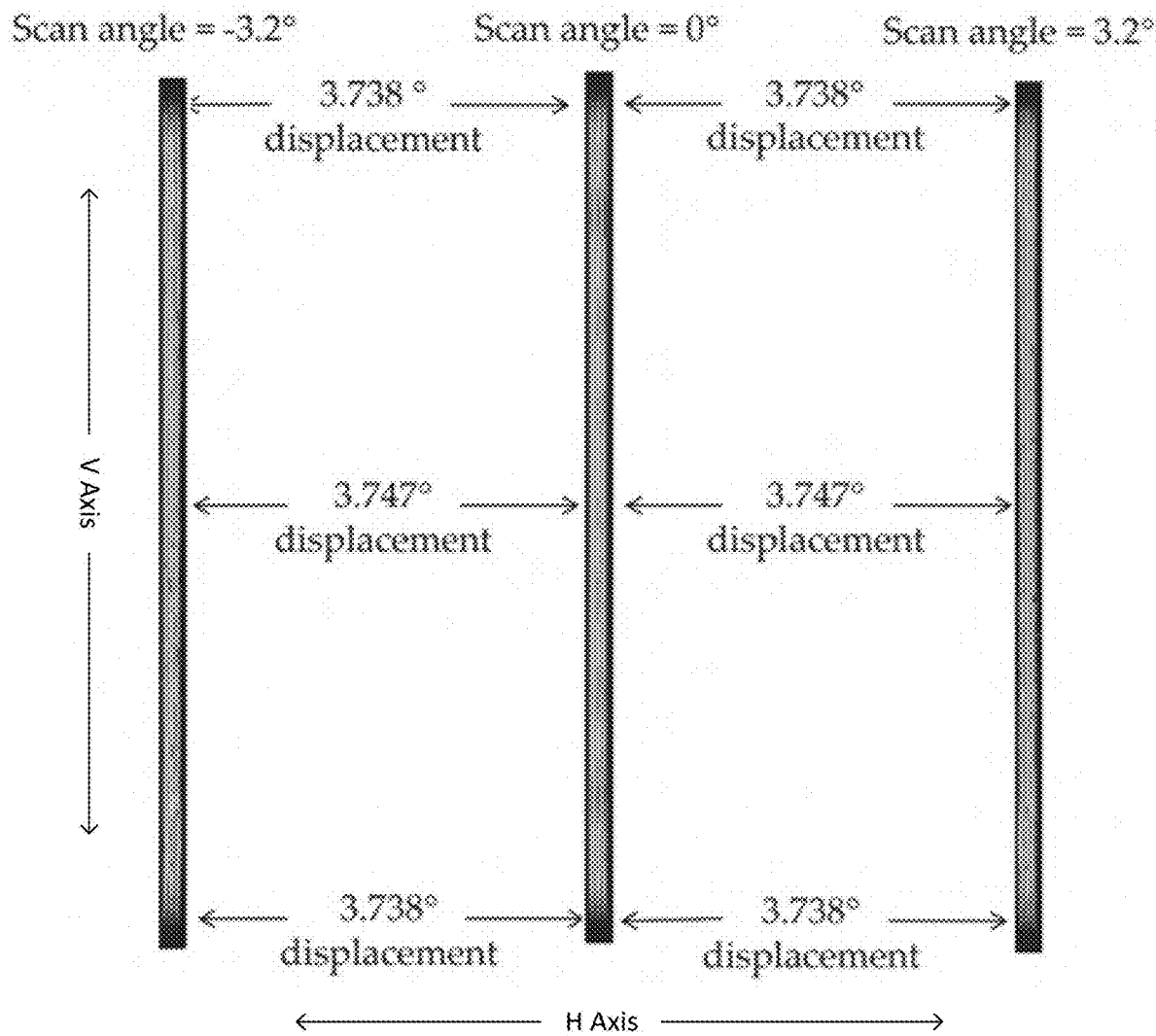
FIG. 2 shows the combined far-field laser beam shape produced by the optical module of FIG. 1 as three different points in the one-dimensional scan pattern utilized by the optical module.

The convex-concave lens 25, doublet 26, and plano-concave lens 29 cooperate to help maintain the far field radiation pattern as being generally constant regardless of the position of the combined laser beam in its scan pattern, as well as to properly shape the end-caps of the far field irradiation pattern, as shown in FIG. 2.

Figure 3:
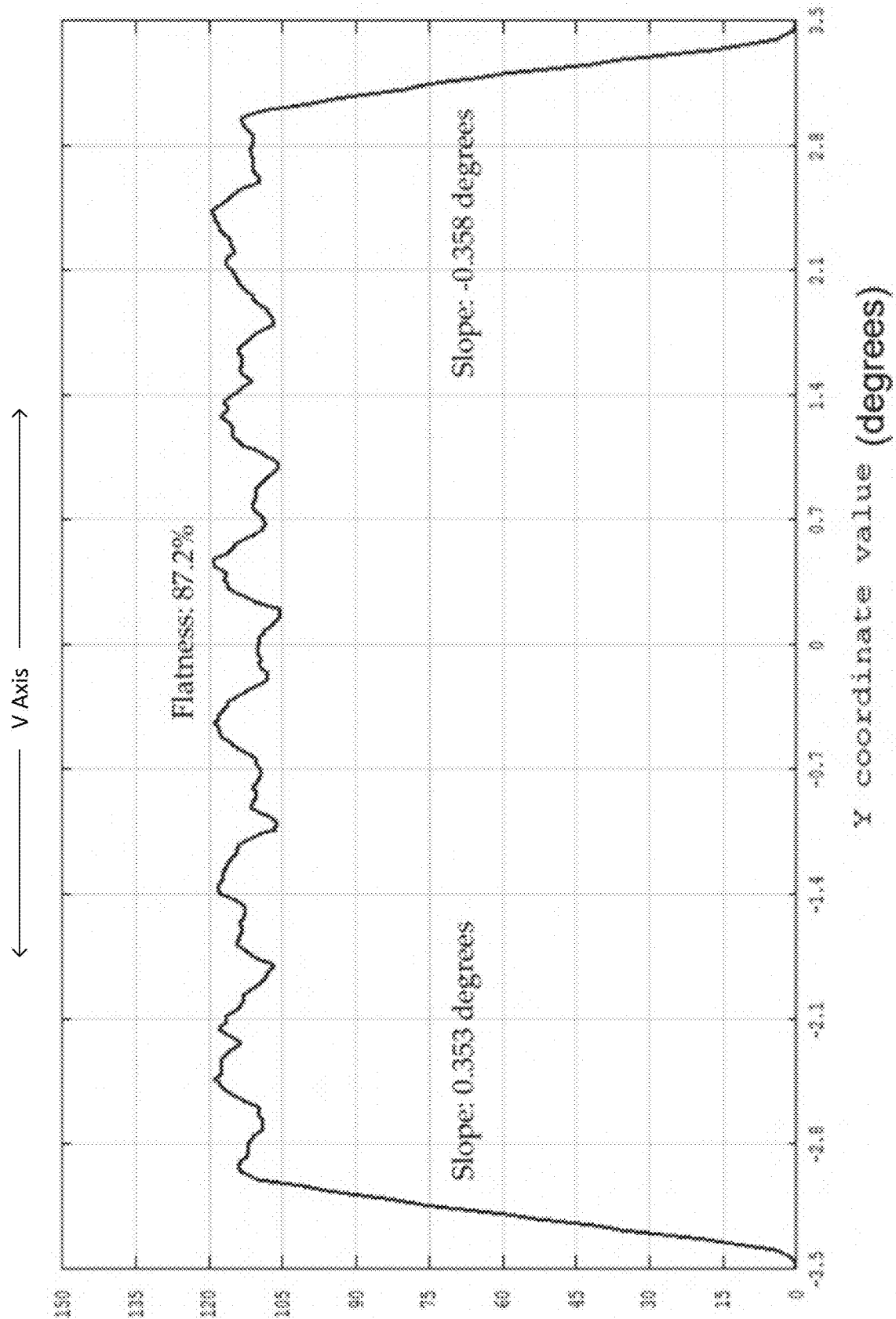
FIG. 3 is a graph showing the vertical cross section of the far field laser irradiance produced by the optical module of FIG. 1.
Figure 4:
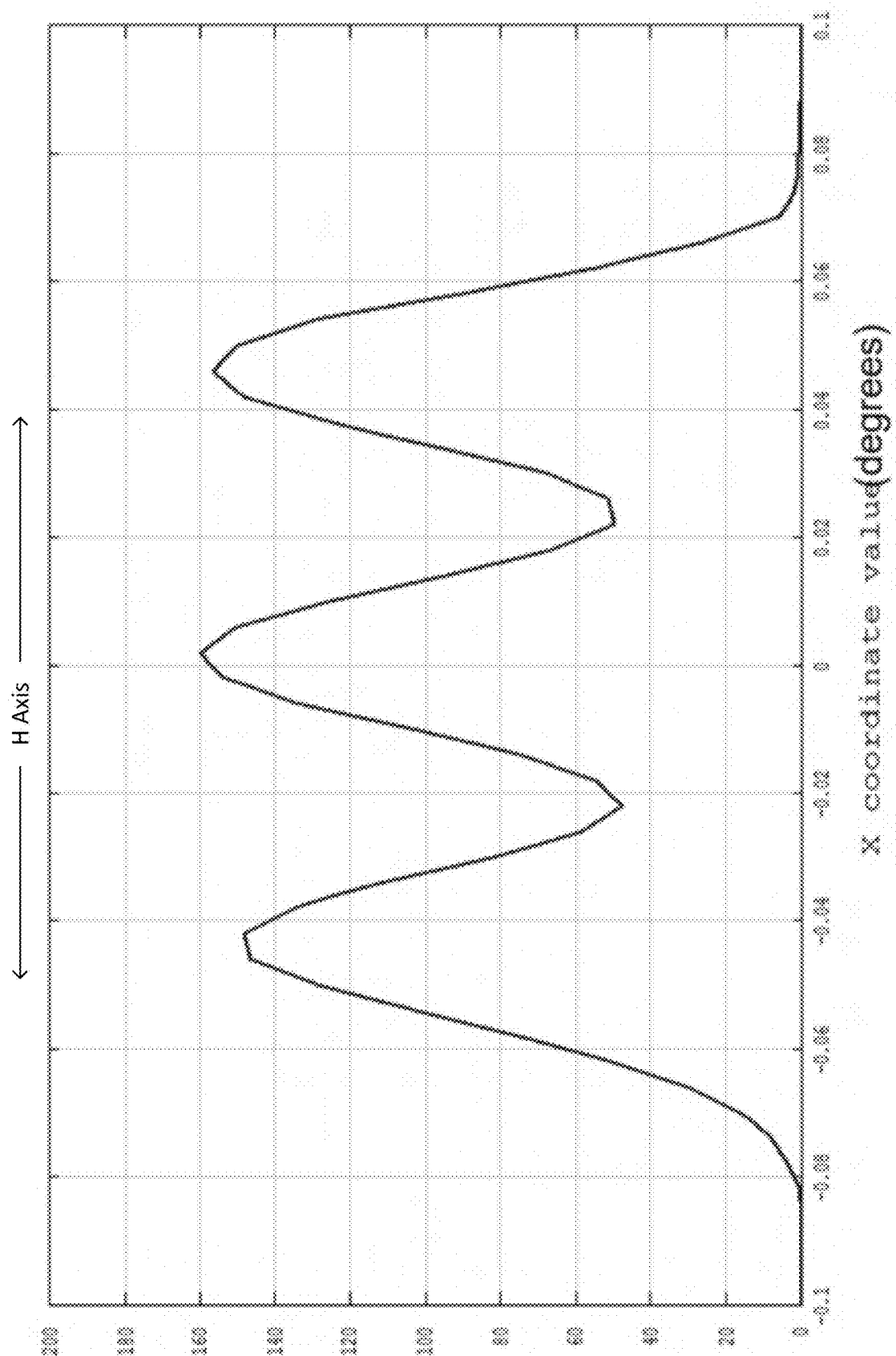
FIG. 4 is a graph showing the horizontal cross section of the far field laser irradiance produced by the optical module of FIG. 1.

Shown in FIG. 3 is graph showing the vertical cross section of the combined laser beam (vertical cross section of the beam shown in FIG. 2) where it can be observed that the combined laser beam is generally top-hat shaped with a relatively flat top plateau. A graph showing the horizontal cross section of the combined laser beam (horizontal cross section of the beam shown in FIG. 2) is shown in FIG. 4 where it can observed that the combined laser beam has three peaks in its horizontal cross section (resulting from the multiple laser emitters used to form the combined laser beam). Collectively, the resulting combined laser beam having the illustrated vertical and horizontal cross sections meets desired efficiency levels of over 90% with acceptable beam uniformity while properly passing through the exit window 31 without impinging on the interior of the housing 5 about the periphery of the exit window 31. The optics could be adjusted to provide for greater beam uniformity but efficiency would resultingly suffer.

Figure 5:
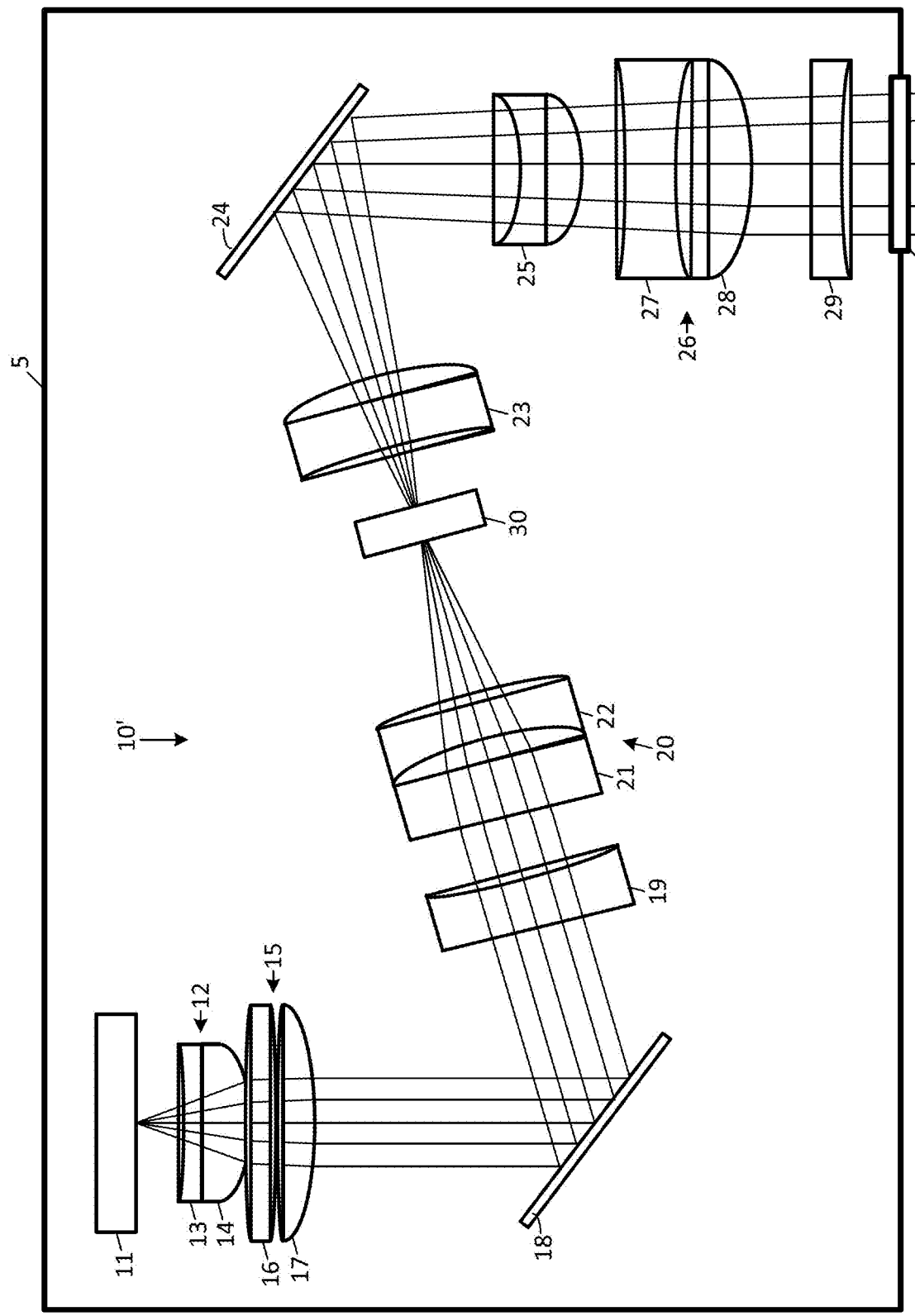
FIG. 5 is a diagrammatical representation of a second embodiment of an optical module disclosed herein such as may be used in a distance determination system.

In an alternate embodiment shown in FIG. 5, a diffuser 30 is placed at the focal point within the housing 5. This diffuser 30 serves to improve the uniformity of the vertical cross section of the combined laser beam, but at the expense of efficiency.

Figure 6:
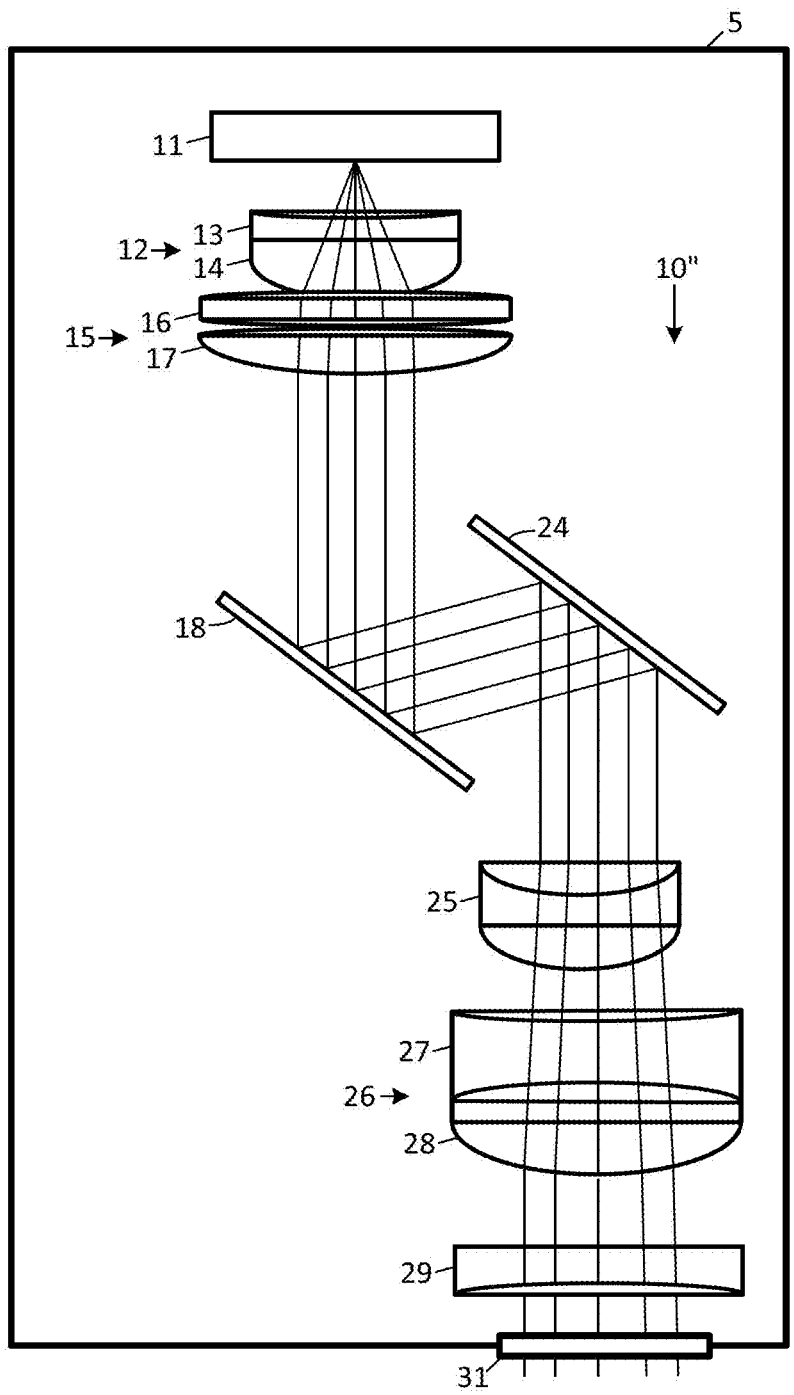
FIG. 6 is a diagrammatical representation of a third embodiment of an optical module disclosed herein such as may be used in a distance determination system.

The plano-concave lens 19, lens doublet 20, and concave-convex lens 23 may be removed if the optical path length is shortened, as shown in FIG. 6. Here, the mirror 24 is immediately downstream of the folding mirror 18.

Figure 7:
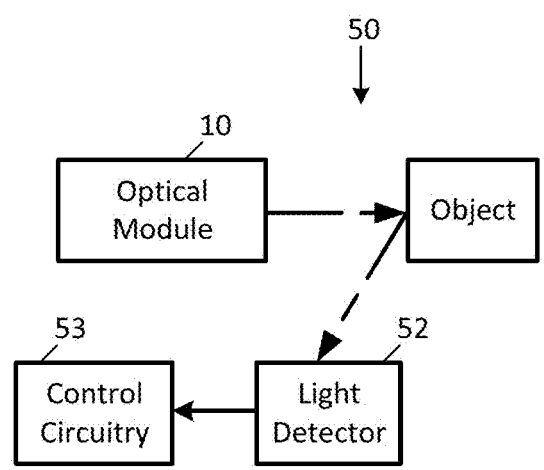
FIG. 7 is a block diagram of a LIDAR system utilizing the optical module of FIG. 1.

The optical module 10 described above may be utilized in a light detection and ranging (LIDAR) system 50, as shown in FIG. 7. A light detector array 51 is added so that the time between emission of a pulse of the laser and detection of photons of that laser pulse that have reflected off an object and been detected by the detector can be determined by control circuitry 52. Given this time of flight and with the understanding of where the laser beam was scanned at any instant in time, a three-dimensional map of objects in the field of view can be formed by the control circuitry 53 and utilized by hardware external to the LIDAR system 50.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An optical module, comprising:
   a first lens doublet receiving a combined laser beam, the first lens doublet comprising: a first plano-concave lens having an upstream surface with a concave cross section and a downstream surface with a planar cross section, and a first plano-convex lens downstream of the first plano-concave lens having an upstream surface with a planar cross section and a downstream surface with a convex cross section;
   a second lens doublet downstream of the first lens doublet and comprising: a first concave lens, and a second lens downstream of the first concave lens having an upstream surface with a convex cross section and a downstream surface with a paraboloid cross section;
   a concave-convex lens downstream of the second lens doublet and having an upstream surface with a concave cross section and a downstream surface with a convex cross section;
   a third lens doublet downstream of the concave-convex lens and comprising: a second concave lens, and a convex lens downstream of the second concave lens; and
   a second plano-concave lens having an upstream surface with a planar cross section and a downstream surface with a concave cross section;
   wherein the first lens doublet, second lens doublet, concave-convex lens, third lens doublet, and second plano-concave lens cooperate to shape the combined laser beam to have high-divergence along a first axis but low-divergence along a second axis.

2. The optical module of claim 1, further comprising:
   a laser array comprised of a plurality of laser emitters arranged into a line and spaced apart from one another such that individual laser beams generated by adjacent laser emitters of the plurality of laser emitters at least partially overlap so that the combined laser beam is produced by the laser array; and
   a mirror downstream of the second lens doublet and upstream of the concave-convex lens, the mirror being operable to scan the combined laser beam along the second axis.

3. The optical module of claim 2, wherein the mirror is a uniaxial microelectromechanical (MEMS) mirror.

4. The optical module of claim 1, further comprising a folding mirror downstream of the second lens doublet.

5. The optical module of claim 1, further comprising:
   a third plano-concave lens downstream of the second lens doublet and upstream of the concave-convex lens, the third plano-concave lens having an upstream surface with a planar cross section and a downstream surface with a concave cross section;
   a fourth lens doublet downstream of the third plano-concave lens and upstream of the concave-convex lens, the fourth lens doublet comprising: a second plano-convex lens having an upstream surface with a planar cross section and a downstream surface with a convex cross section, and a concave-convex lens downstream of the third plano-concave lens and having an upstream surface with a concave cross section and a downstream surface with a convex cross section; and
   a convex-concave lens downstream of the fourth lens doublet and upstream of the concave-convex lens, the convex-concave lens having an upstream surface with a concave cross section and a downstream surface with a convex cross section.

6. The optical module of claim 5, further comprising a mirror downstream of the convex-concave lens and upstream of the concave-convex lens, the mirror being operable to scan the combined laser beam along the second axis.

7. The optical module of claim 5, further comprising a diffuser downstream of the third lens doublet and upstream of the concave-convex lens, wherein the diffuser increases uniformity of a vertical cross section of the combined laser beam.

8. The optical module of claim 1, wherein the first lens doublet, second lens doublet, concave-convex lens, third lens doublet, and second plano-concave lens are carried within a housing, wherein the housing has an exit window formed therein; and wherein the combined laser beam passes through the exit window after exiting the second plano-concave lens without impinging upon surrounding portions of the housing.

9. An optical module for use in a light detection and ranging (LIDAR) device, the optical module comprising:
   a laser array comprised of a plurality of laser emitters arranged into a line and spaced apart from one another such that individual laser beams generated by adjacent laser emitters of the plurality of laser emitters at least partially overlap so that a combined laser beam is produced by the laser array;
   a first lens configured to receive the combined laser beam and focus a fast axis thereof;
   a second lens downstream of the first lens and configured to focus a slow axis of the combined laser beam, wherein a cross section of the combined laser beam as the combined laser beam exits the second lens is generally pill shaped;

a mirror downstream of the second lens, the mirror being operable to scan the combined laser beam along a second axis;

a third lens downstream of the mirror, a fourth lens downstream of the third lens, and a fifth lens downstream of the fourth lens, wherein the first lens, second lens, and third lens cooperate to maintain a shape of the combined laser beam as being consistent as the mirror scans the combined laser beam along the second axis; and a housing carrying the laser array, first lens, second lens, mirror, third lens, fourth lens, and fifth lens, the housing having an exit window formed therein, wherein the combined laser beam passes through the exit window after exiting the fifth lens without impinging upon surrounding portions of the housing;

wherein the first lens, second lens, third lens, fourth lens, and fifth lens cooperate to shape the combined laser beam to have high-divergence along a first axis but low-divergence along the second axis.

10. The optical module of claim 9, wherein the first lens comprises a first lens doublet; wherein the second lens comprises a second lens doublet; and wherein the fourth lens comprises a third lens doublet.

11. The optical module of claim 10, wherein the first lens doublet is comprised of a first plano-concave lens a first plano-convex lens downstream of the first plano-concave lens; wherein the second lens doublet is comprised of a first concave lens and first convex lens downstream of the first concave lens; and wherein the third lens doublet is comprised of a second concave lens, and a second convex lens downstream of the second concave lens.

12. The optical module of claim 11, wherein the third lens comprises a concave-convex lens; and wherein the fifth lens comprises a second plano-concave lens.

13. The optical module of claim 12, further comprising: a third plano-concave lens downstream of a folding mirror that is downstream of the second lens and upstream of the third lens, the third plano-concave lens being upstream of the mirror; and a fourth lens doublet downstream of the third plano-concave lens and upstream of the mirror, the fourth lens doublet comprising: a second plano-convex lens and a concave-convex lens downstream of the third plano-concave lens; and a convex-concave lens downstream of the fourth lens doublet and upstream of the mirror.

14. The optical module of claim 9, further comprising a folding mirror downstream of the second lens and upstream of the third lens.

15. A method, comprising:
generating a combined laser beam by generating multiple individual laser beams sufficiently close to one another such that adjacent ones of the individual laser beams at least partially overlap;
focusing the combined laser beam so as to have a substantially greater divergence along a vertical axis than along a horizontal axis; and
receiving the combined laser beam at a micromirror and scanning the combined laser beam along the horizontal axis using the micromirror, wherein the focusing of the combined laser beam is such that it fits through an exit aperture as it is scanned along the horizontal axis without impinging upon a housing into which the exit aperture is defined and such that it remains relatively uniform and homogenous as it is scanned along the horizontal axis.

16. The method of claim 15, further comprising measuring an elapsed time between emission of a pulse of the combined laser beam and detection of photons of that pulse that have reflected off an object, and determining a distance to the object based upon the elapsed time.

17. The method of claim 15, wherein focusing the combined laser beam results in the combined laser beam having a vertical cross section that is generally plateau-shaped with a flat top.

* * * * *